Patented Dec. 26, 1944

2,365,713

UNITED STATES PATENT OFFICE 2,365,713

AUTOMATIC PRESSURE LOADER

Allen D. MacLean, Pittsburgh, Frederick H. Kindl, Wilkinsburg, and Howard J. Evans, Export, Pa., assignors to Pittsburgh Equitable Meter Company, Pittsburgh, Pa., a corporation of Pennsylvania Application June 8, 1942, Serial No. 446,244

2 Claims. (Cl. 50—16)

This invention relates to fluid pressure regulating means, particularly applicable to high pressure distribution systems for increasing the pressure in the distribution system in accordance with the demands made upon the system.

Pilot loading or control systems heretofore have been proposed for controlling the pressure in a distribution main. Such devices as heretofore employed tend to maintain a uniform outlet pressure and do not increase or boost the pressure in accordance with the demand. The apparatus used in low pressure systems for boosting the pressure are generally not satisfactory for high pressure systems for the reasons, among others, that the pressures are too great for the use of large sensitive diaphragms.

According to the present invention, we provide in a distribution system a main valve which is controlled by differential pressures applied on opposite sides of a pressure responsive device, one of which pressures is provided by means of a pilot flow of fluid controlled by a pilot regulator, and we control the pilot regulator in accordance with the flow or demand in the distribution main to vary the pressure in the distribution main. To overcome the effect of changing pressure in the pilot flow on the pilot regulator, we employ counterbalancing diaphragms or equivalent elements of substantially equal area, and we limit the boost by limiting the pressure supplied to the pilot regulator.

Figure 1:
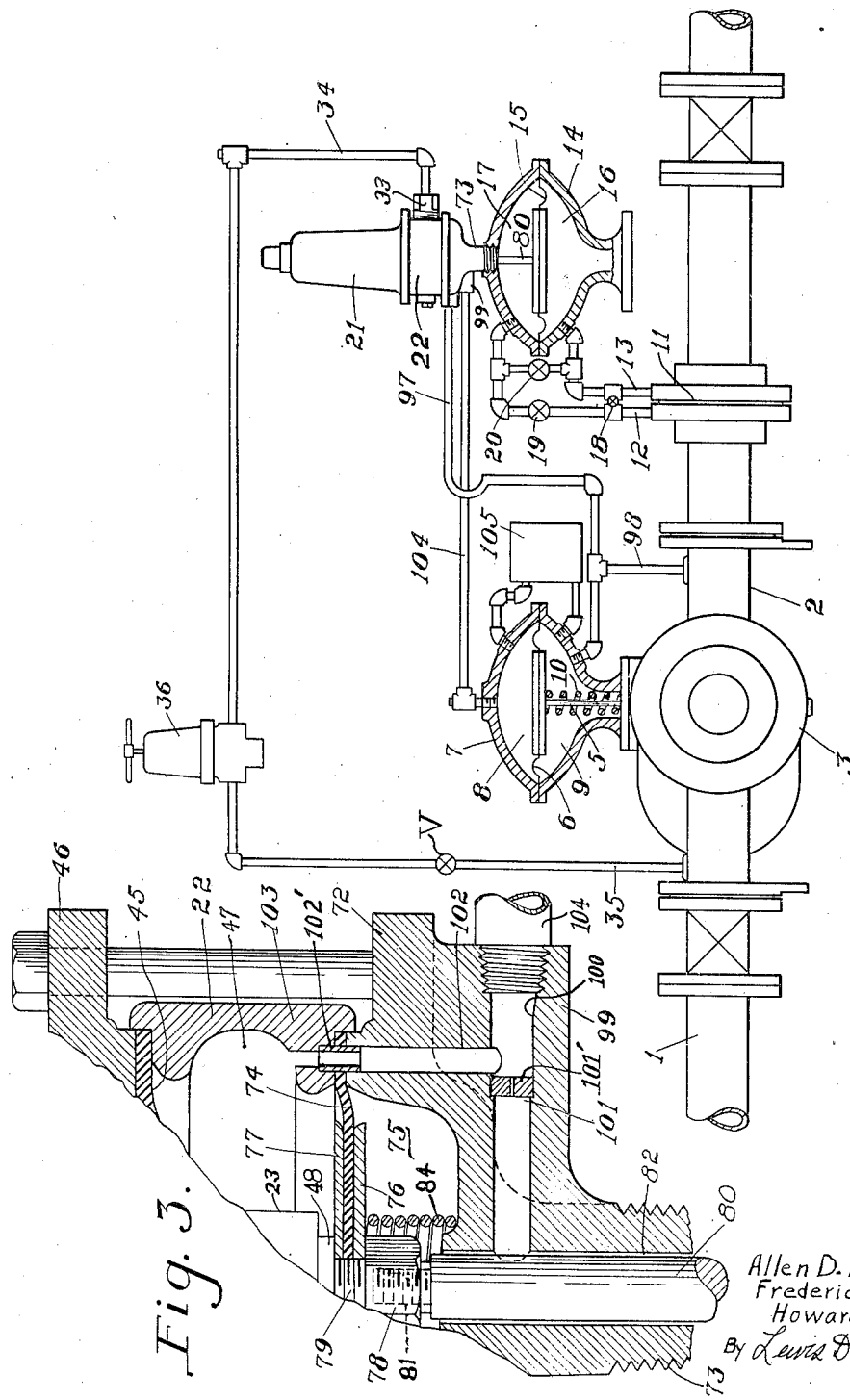

The invention will be described in more detail in the following specification, taken in connection with the accompanying drawings, wherein we have shown a preferred embodiment of the invention by way of example, and wherein:

Figure 1 diagrammatically shows our system applied to a pipeline.

Figure 2:
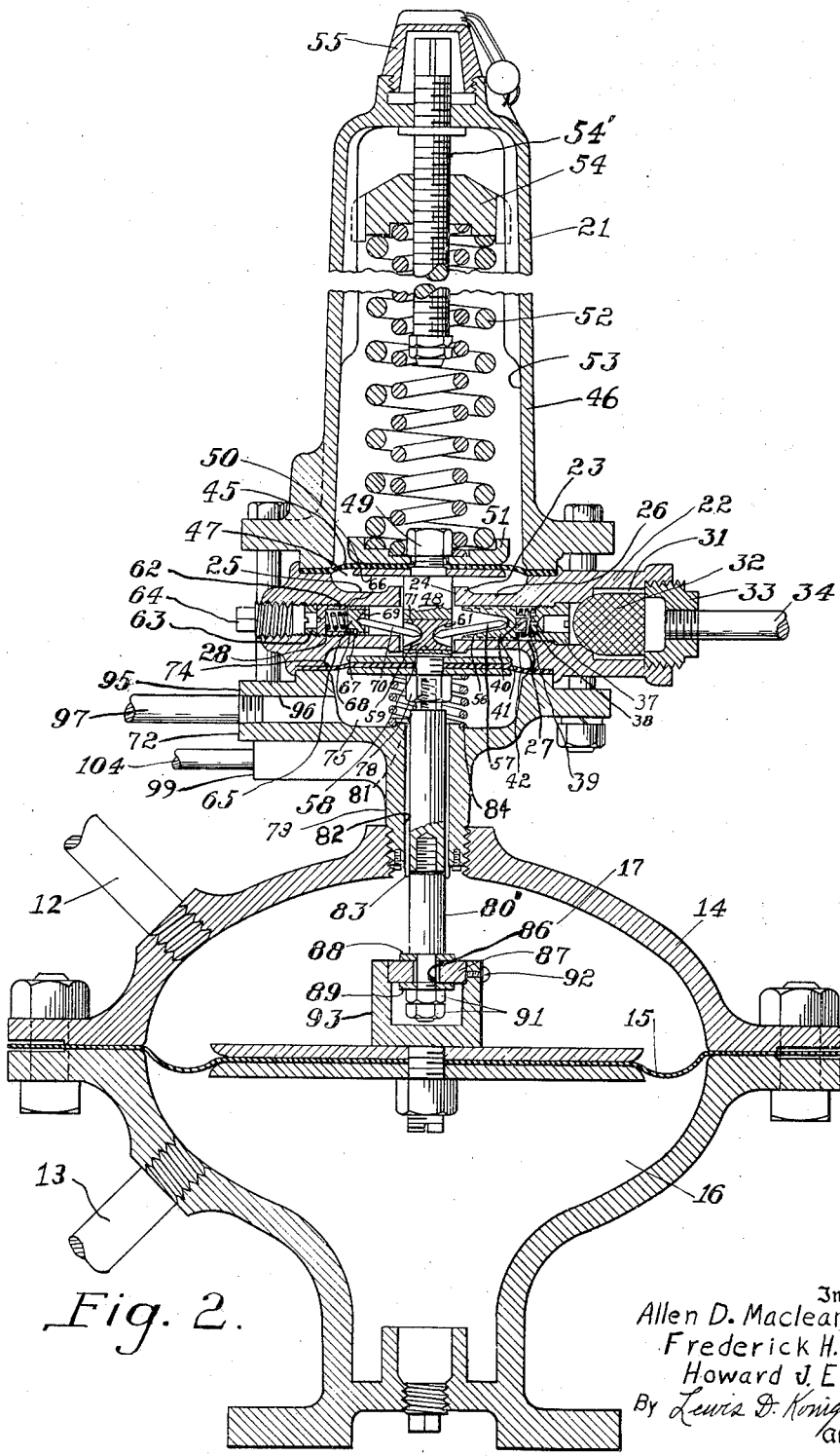

Figure 2 is an enlarged view of the pilot regulator and differential loading diaphragm, and Figure 3 is an enlarged view of a detail of the pilot regulator.

Referring to Figure 1 of the drawings, the system comprises a high pressure pipeline 1 and a low pressure pipeline 2 having a valve 3 located therebetween. This valve may be of any suitable construction and preferably has a valve member which moves upwardly to shut off communication between mains 1 and 2, and is operably connected by a stem 5 to a suitable pressure responsive means, such as a diaphragm 6 located in a case 7 which provides chambers 8 and 9 on opposite sides of the diaphragm. A spring 10 is located in chamber 9 to bias the valve to closed position. The stem passes from chamber 9 into the valve body and is sealed from the outlet side of the valve by a stuffing box (not shown) or in any other suitable manner.

An orifice plate 11 is located in the low pressure main and has an opening therethrough (not shown) of the desired size, and conduits 12 and 13 are connected into the main 2 on the upstream and downstream sides respectively of the orifice plate whereby, when flow occurs in conduit 2, a pressure differential is set up in the conduits 12 and 13 in known manner. A differential case 14 contains a pressure responsive means, such as a diaphragm 15 which divides the case into a low pressure chamber 16 and a higher pressure chamber 17 so that the diaphragm 15 is biased in one direction or the other, depending on the relationship of the pressures in the chambers 16 and 17. The casing 14 may be similar to the casing 7 with its bottom sealed by a plug (Figure 2) or in any other suitable manner. A needle valve 18 provides an adjustable bypass between conduits 11 and 12, and a second needle valve 19, preferably in conduit 12, provides an adjustable control orifice. The valve 20 between conduits 12 and 13 normally is closed during operation of the apparatus, and is provided to facilitate installation or dismantling of the apparatus.

A pilot loading or control regulator 21 is mounted on differential casing 14, the preferred construction of this regulator being shown in Figures 2 and 3. This regulator comprises a middle housing member 22 having central hub 23 which is longitudinally bored at 24 and the casing has radial spokes 25 and 26 integral therewith. The threaded bores 27 and 28 extend through the spokes and communicate with the central bore 24 in the hub. A well or recess 31 in the casing 22 is adapted to receive a filter 32 of wire gauze or other suitable material secured to a threaded plug 33 in any suitable manner, and the casing has an inlet pipe 34 threaded into the plug 33 to permit the entry of fluid of the desired pressure. This fluid preferably is introduced by a conduit 35 connected to the high pressure main 1 and if desired, an outlet pressure regulator 36 of conventional construction, which tends to maintain a predetermined pressure in conduit 34 may be employed in the conduit 35. Radial bore 27 communicates with the well 31 and has a valve orifice bushing 37 threaded therein having an orifice 38 through the bushing terminating in a receding or slightly conical valve face 39 around the orifice. A noncircular member 40 which, as shown, is in the form of a hexagonal plug, is slidably received in the bore 27 and carries a valve insert 41 of rubber, "Thiocol," soft metal or other suitable resilient material at its inner end which is adapted to seat against the valve face 39 of the valve bushing. A light helical spring 42 is interposed between the valve member 40 and the valve bushing 37 and abuts against suitable shoulders provided thereon.

A diaphragm 45 is secured at its periphery between the spring cover 46 and the surface of casing 22 to provide a valve chamber 47 on one side. A cylindrical guide or connecting member 48 extends through bore 24 with a suitable clearance and at its upper end is secured to the diaphragm 45 by a cap screw 49, the diaphragm being clamped thereby between washer 50 and diaphragm plate 51. The spring 52 in the recess 53 of the cover bears against the diaphragm 45 and by means of a threaded stem 54' and a threaded abutment bushing 54 in the recess the spring may be adjusted to exert the proper loading force on the diaphragm. The upper end of spring cover 46 is closed by a cap 55 and a suitable atmospheric vent (not shown) is provided in the spring cover. The connecting member 48 is transversely bored at 58 and receives a shoe 59 with a close sliding fit, this shoe having a generally tapered recess 61 at one end which receives one end of toggle rod 57, the other end being received in a conical recess 56 in valve member 40.

A threaded thimble 62 is locked in position in bore 28 by a threaded locking plug 63 and the end of bore 28 is closed by a pipe plug 64. Thimble 62 slidably receives a piston 65 which is urged in one direction by spring 66, a pin 67 extending into a slot 68 in the piston serving to limit movement thereof. The piston 65 has a tapered recess which receives one end of toggle rod 70, the other end of the toggle rod being received in a tapered recess 71 in the opposite end of shoe 59. The purpose of this construction is to provide a yieldable abutment 65 so that when the valve member 40 is closed any further movement of the central guide member will not crush the valve insert 41. The toggle rods 57 and 70 are pointed at their ends, thus providing a bearing surface of reduced area that reduces friction.

A lower casing 72 is suitably secured to the middle casing 22 and has a projecting portion or extension 73 threaded or otherwise suitably secured in the wall of differential case 14. A lower diaphragm 74 providing a control chamber 75, is secured at its periphery between the lower portion 72 and the middle case 22, and at its center is secured between plates 76 and 77 (Figure 3) to the middle cylindrical connecting member 48 by a nut 78 threaded onto a suitable extension thereof. A stem 80 is threaded into a bore 81 in the connecting member 48 and extends through bore 82 in the extension 73 into the interior of chamber 17, the stem 80 being sealed with respect to the bore 82 by a diaphragm 83 clamped at its center between stem 80 and a portion 80' thereof, or by any other suitable means. This stem 80, it will be noted, provides a clearance with the bore 82 through which it passes. A light spring 84 surrounding the stem 80 is interposed between the lower diaphragm 74 and the lower wall of casing 72 to substantially counterbalance the weight of the diaphragms, diaphragm plates, connecting member, etc.

The lower end of stem 80 is reduced and threaded at 86 and has an annulus 87 loosely fitting thereon and guided between plates 88 and 89 which are locked in fixed position by lock nuts 91. The plates 88 and 89 engage the annulus loosely enough to allow it to move freely in a transverse direction while allowing as little longitudinal lost motion as possible. The annulus 87 is rigidly held by a set screw 92 in a cup member 93 on the diaphragm 15. This construction allows stem 80 to be longitudinally misaligned with the center of diaphragm 15 without becoming cocked or canted, or otherwise interfering with the operation of diaphragms 15, 74 or 45.

A boss 95 on the lower casing 72 has a threaded bore 96 communicating with chamber 75, and a conduit 97 connected to the bore 96 communicates with the lower chamber 9 (Figure 1) of regulator casing 7, a branch conduit 98 being joined into the low pressure main 2. Angularly offset from boss 95 is a boss 99 with a bore 100 therein (Figure 3) connecting with a vertical bore 102 in casing 72 connecting with valve chamber 47 through a bushing 102' which passes through the diaphragm 74. A conduit 104 connects bore 100 with the upper chamber 8 of the case 7. A bushing 101' having a small bleed orifice therein allows a small bleed from chamber 47 through bores 102 and 100 into bore 101 which connects into middle bore 82 and thence into control chamber 75. A double-acting safety valve 105 of known construction provides for venting chambers 8 and 9 to the atmosphere should the pressure therein exceed a safe limit.

The operation of the apparatus now will be described. An orifice plate 11 is selected with about the proper size orifice that is suitable for the amount of boost required. The pressure in main 2 is transmitted by conduits 98 and 97 and by passage 96 (Figure 2) into control chamber 75 where it acts upon diaphragm 74 to control the opening or closing of valve 40. With valves 18 and 20 open the valve V in conduit 35 is opened and fluid from conduit 35 enters the regulator 36 passing therethrough into conduit 34, and from conduit 34 the fluid enters the regulator 21 through the filter 32 and orifice 38 in the bushing 37, and past valve member 40 and the clearance between bore 24 and member 48 into chamber 47, thence through bushing 102' (Figure 3) passages 102 and 100, and conduit 104 to chamber 8 on one side of diaphragm 6. A bleed also occurs from valve chamber 47 through passages 102, 100, orifice bushing 101', passage 101 and bore 82 into control chamber 75. However, because of the small size of the orifice in bushing 101' and the relatively large size of the connecting passage 96 and conduit 97 to main 2, this bleed has substantially no effect on the pressure in chamber 75. Chamber 9 is connected by conduits 97 and 98 to the main 2.

From the description so far pursued, it will be seen that with a given setting for spring 52 of regulator 21, the pressure in chamber 8 will be controlled by the pressure in chamber 75 which, in the present device, is substantially the same as the pressure in main 2. As an increase in pressure in chamber 75 tends to decrease the pressure in chambers 47 and 8, the operation as thus far explained would keep the pressure in main 2 constant. Spring 52 is now adjusted so as to maintain the desired minimum pressure in main 2, this adjustment being made at that time of the day or night when minimum consumption prevails.

With valves 18 and 20 closed, and valve 19 open slightly, an increase in flow in main 2 will produce a pressure difference across orifice plate 11 which is transmitted to opposite sides of diaphragm 15. Assuming an increase in flow, the diaphragm 15 will be biased downwardly to cause an increased loading force on diaphragm 74 and hence will cause valve 40 to open more and load diaphragm 6 to increase the pressure in main 2. As this loading is a cumulative action, the regulator 36 is provided so that when the full pressure in conduit 34 is transmitted to chamber 8 no further increase in pressure in main 2 occurs. This provides a limit of boost to prevent the pressure in main 2 going above the desired limit. The pilot flow in this apparatus is not exhausted to the air but returns to the main 2 through the conduits 97 and 98, this being of particular advantage as it eliminates the explosion hazard which exists when combustible gas is exhausted to the air and eliminates the waste of gas which would otherwise occur. If desired, to exhaust the pilot flow to the air, spring 10 may be omitted. The diaphragms 45 and 74 are of equal area so that the pressure in chamber 47 has practically no effect on the action of valve member 40, which responds solely to the control pressure in chamber 75 and the differential force on diaphragm 15.

Valve 18 serves as a bypass valve to vary the ratio of differential between chambers 17 and 16 to flow through orifice plate 11. Valve 19 serves to vary or control the rate at which the differential between conduits 12 and 13 is transmitted to chambers 17 and 16. Thus, if the boost for a given increase in flow in main 2 is too great, opening of valve 18 will lower the boost for that particular rate of flow, while opening valve 19 will cause diaphragm 15 to respond more rapidly to the differential between conduits 12 and 13. If desired, the orifice plate 11 may be replaced by the inserted Venturi tube and orifice plate shown in MacLean and Niesemann Patent No. 2,093,842 issued September 21, 1937, or any other suitable device producing a differential proportional to flow.

Although we have shown in regulator 21 a toggle connection between the valve 40 and diaphragms 45 and 74, it will be understood that any other desirable type of connection may be employed.

What we claim as our invention and desire to secure by United States Letters Patent is:

1. In a gas distribution system, a high pressure main, a low pressure main, and a valve between said mains to control the flow therethrough, a main pressure responsive means providing main fluid pressure chambers on opposite sides thereof and operatively connected to said valve, means connecting said high pressure main to one of said main fluid pressure chambers including a pilot regulator having spaced connected diaphragms providing a valve chamber therebetween and a control chamber on one side of one of said diaphragms, a valve in said valve chamber operatively connected to said spaced diaphragms to control admission of fluid thereto, means providing a bleed connection between said valve chamber and said low pressure main, a second pressure responsive means connected to said pilot regulator diaphragms and providing differential pressure chambers on opposite sides thereof, means in the low pressure main providing a differential pressure proportional to flow, conduits connecting said latter means to said differential pressure chambers, and means connected to said low pressure main between said main valve and differential pressure means for conducting the pressure of the low pressure main to the other of said main fluid pressure chambers and to said control chamber.

2. In a gas distribution system, a high pressure main, a low pressure main, and a valve between said mains to control the flow therethrough, a main pressure responsive means providing main fluid pressure chambers on opposite sides thereof and operatively connected to said valve, means connecting one of said chambers to the low pressure main, means connecting said high pressure main to the other of said main fluid pressure chambers including a pilot regulator having spaced connected diaphragms providing a valve chamber therebetween and a control chamber on one side of one of said diaphragms, a valve in said valve chamber operatively connected to said spaced diaphragms to control admission of fluid thereto, means providing a bleed connection between said valve chamber and said low pressure main, means providing fluid communication between said control chamber and the low pressure main, a second pressure responsive means connected to said pilot regulator diaphragms and providing differential pressure chambers on opposite sides thereof, means in the low pressure main providing a differential pressure proportional to flow, conduits connecting said latter means to said differential pressure chambers, a cross conduit between said latter conduits, and a throttle valve in said cross conduit.

ALLEN D. MACLEAN.
FREDERICK H. KINDL.
HOWARD J. EVANS.